US011589595B2

(12) United States Patent
Critchley et al.

(10) Patent No.: US 11,589,595 B2
(45) Date of Patent: Feb. 28, 2023

(54) CHEESE TOPPINGS FOR BAKED SNACKS SUITABLE FOR PREBAKE APPLICATION

(71) Applicant: Intercontinental Great Brands LLC, East Hanover, NJ (US)

(72) Inventors: Jill Critchley, East Hanover, NJ (US); Lynn Haynes, East Hanover, NJ (US); Alan Kino, East Hanover, NJ (US); Kenneth Maas, East Hanover, NJ (US); Mihaelos Mihalos, East Hanover, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 766 days.

(21) Appl. No.: 16/457,239

(22) Filed: Jun. 28, 2019

(65) Prior Publication Data

US 2020/0404937 A1    Dec. 31, 2020

(51) Int. Cl.
*A23C 19/086* (2006.01)
*A21D 13/10* (2017.01)
*A21D 13/22* (2017.01)
*A23C 19/076* (2006.01)

(52) U.S. Cl.
CPC ............ *A23C 19/086* (2013.01); *A21D 13/10* (2017.01); *A21D 13/22* (2017.01); *A23C 19/076* (2013.01); *A23C 2250/10* (2013.01); *A23V 2002/00* (2013.01)

(58) Field of Classification Search
CPC . A23C 19/086; A23C 19/076; A23C 2250/10; A21D 13/10; A21D 13/22
See application file for complete search history.

(56) References Cited

U.S. PATENT DOCUMENTS

| 4,482,575 A | 11/1984 | Olds |
| 4,568,555 A * | 2/1986 | Spanier .................. A23L 23/00 |
| | | 426/573 |
| 4,609,555 A | 9/1986 | Becher |

(Continued)

FOREIGN PATENT DOCUMENTS

| EP | 0547551 | 6/1993 |
| EP | 0792105 | 9/1997 |

(Continued)

OTHER PUBLICATIONS

International Search Report and Written Opinion for International Application No. PCT/US2020/036907 dated Sep. 21, 2020.

(Continued)

*Primary Examiner* — Katherine D Leblanc
(74) *Attorney, Agent, or Firm* — Fitch, Even, Tabin & Flannery LLP

(57) ABSTRACT

A cheese slurry suitable for topical application on a snack product prior to baking includes natural cheese powder solids, an emulsifier, oil, water, and pregelatinized starch in amounts effective to provide a crispy topping having an appearance of melted cheese uniformly adhered to the outer surface of the baked dough product, and up to 1 percent reducing sugars, polyols, or a combination thereof and substantially no enzyme-modified cheese, buttermilk, whey, maltodextrins, or yeast extract so that the cheese slurry composition is resistant to undesirable browning and burning upon baking.

24 Claims, 14 Drawing Sheets

(56) References Cited

U.S. PATENT DOCUMENTS

| | | |
|---|---|---|
| 4,824,684 A | 4/1989 | Barry |
| 4,844,919 A | 7/1989 | Szwerc |
| 5,091,200 A | 2/1992 | Kang |
| 5,204,135 A | 4/1993 | Huang |
| 5,308,636 A | 5/1994 | Tye |
| 5,380,543 A | 1/1995 | Barz |
| 5,405,625 A | 4/1995 | Biggs |
| 5,470,391 A | 11/1995 | Mallee |
| 5,567,464 A | 10/1996 | Barz |
| 5,584,937 A | 12/1996 | Finocchiaro |
| 5,935,633 A | 8/1999 | Derian |
| 6,093,426 A | 7/2000 | Tai |
| 6,733,809 B2 | 5/2004 | Zimmerman |
| 6,905,719 B2 | 6/2005 | Wang |
| 6,905,720 B2 | 6/2005 | Wang |
| 7,521,078 B2 | 4/2009 | Miller |
| 7,867,537 B2 | 1/2011 | Karwowski |
| 8,394,437 B2 | 3/2013 | Lykomitros |
| 9,220,282 B2 | 12/2015 | Wang |
| 9,346,604 B2 | 5/2016 | Thomas |
| 9,510,617 B2 | 12/2016 | Baier |
| 2002/0034570 A1 | 3/2002 | Krammer |
| 2004/0037931 A1 | 2/2004 | Zimmerman |
| 2005/0196509 A1 | 9/2005 | Murphy |
| 2006/0134285 A1 | 6/2006 | Schnieber |
| 2008/0268104 A1 | 10/2008 | di Domenico |
| 2009/0029008 A1 | 1/2009 | Vanos |
| 2009/0291176 A1 | 11/2009 | Nagao |
| 2012/0288590 A1 | 11/2012 | Soane |
| 2013/0196033 A1 | 8/2013 | Anand |
| 2014/0010939 A1 | 1/2014 | Krohn |
| 2016/0316792 A1 | 11/2016 | Schneider |

FOREIGN PATENT DOCUMENTS

| | | |
|---|---|---|
| EP | 0937402 | 8/1999 |
| EP | 1698229 | 9/2006 |
| EP | 3262946 | 1/2018 |
| JP | H07102279 | 4/1995 |
| WO | 2002072102 | 9/2002 |
| WO | 2008151062 | 12/2008 |

OTHER PUBLICATIONS

Mintel, "Enchilada Cheese Squeeze," www.gnpd.com, Jul. 28, 2015.

Mintel, "Three Cheese Pizza Snacks," www.gnpd.com, May 3, 2017.

J. Mounsey et al., "Characteristics of imitation cheese containing native or modified rice starches," Food Hydrocolloids, Elsevier BV, NL, vol. 22, No. 6, Mar. 19, 2008.

N. Noronha et al., "Inclusion of starch in imitation cheese functionality," Food Hydrocolloids, Elsevier BV, NL, vol. 22, No. 8, Dec. 1, 2008.

\* cited by examiner

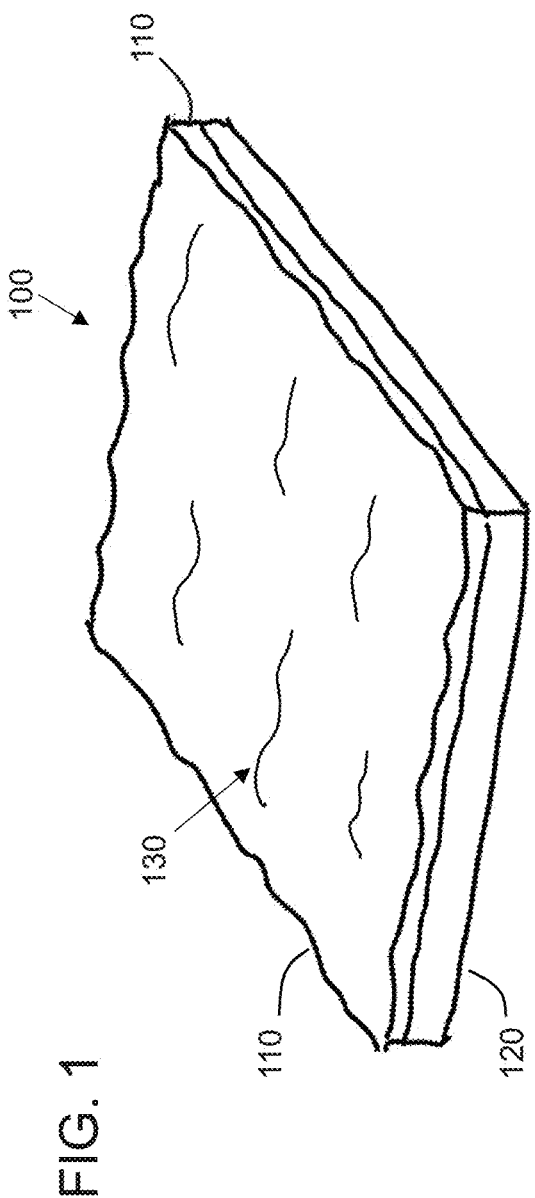
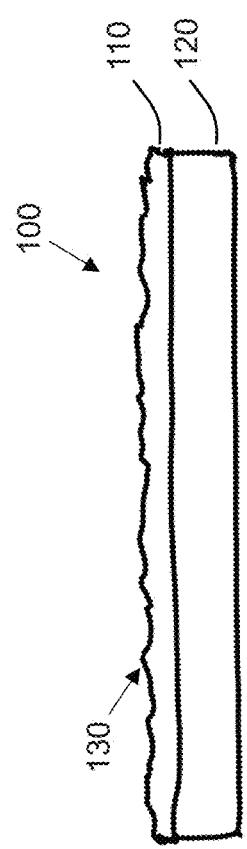

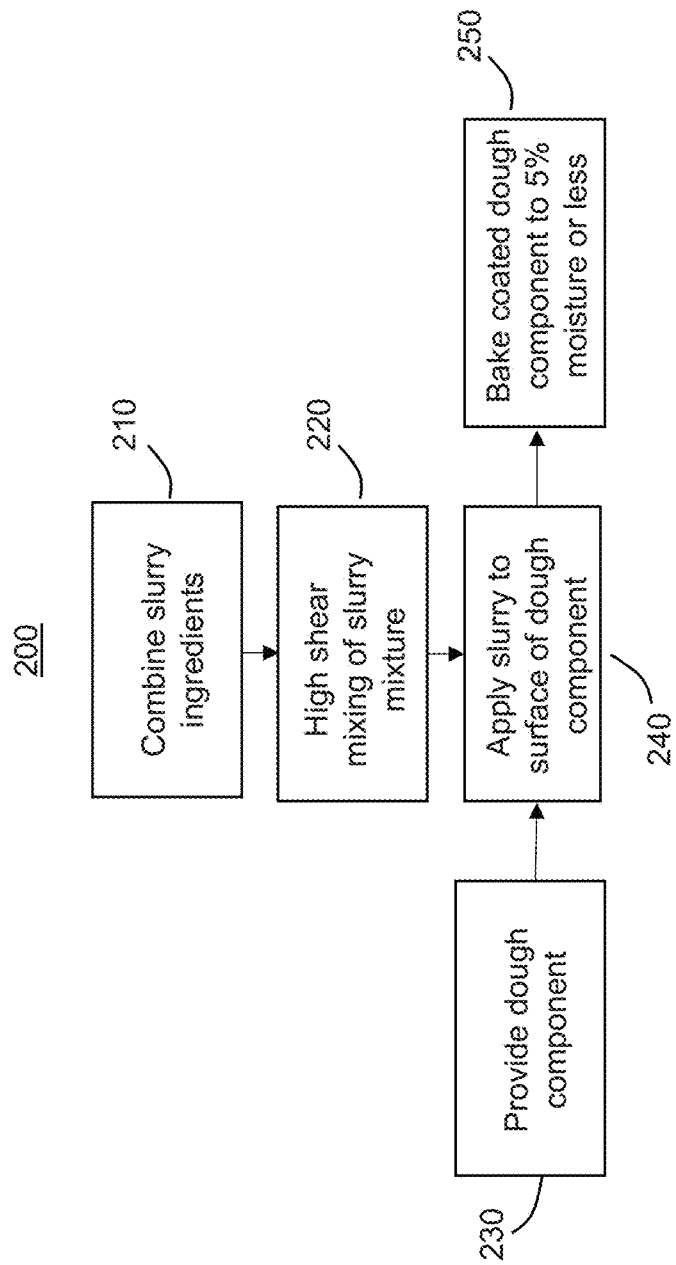

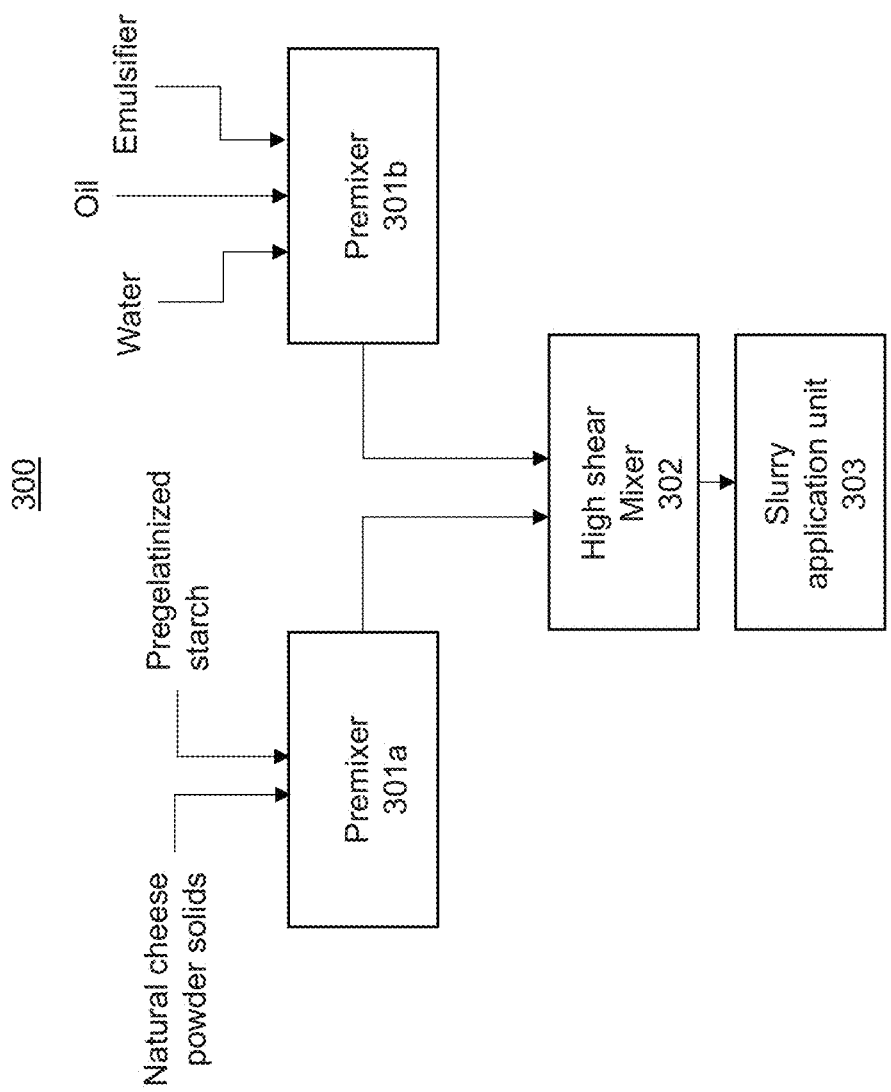

Starch gelation of 40% cheese solids slurry at 10% formula water

3% formula water
320 cP

10% formula water
580 cP

CHEESE TOPPINGS FOR BAKED SNACKS SUITABLE FOR PREBAKE APPLICATION

FIELD

The present application generally relates to cheese toppings that are suitable for application to a snack product prior to baking to provide baked snack products with a crispy, crunchy intensely-flavored topping that simulates the appearance of melted cheese.

BACKGROUND

Baked flavored snack products, such as, for example, cheese-flavored snack crackers, are highly desired by consumers. Conventional seasoning techniques generally involve application of a seasoning powder to a snack cracker post-baking. However, this technique suffers from certain drawbacks. For example, applying seasoning powders to already-baked snack crackers results in limited adhesion of the seasoning to the cracker, which can reduce flavor intensity and result in the seasoning rubbing off on the consumer's hands during handling.

Applying seasoning powders to a snack cracker prior to baking also suffers from drawbacks. For example, pre-bake application of seasoning powders can result in poor adherence, as well as provide the snack cracker with a topping having a hard, undesirable texture. Additionally, conventional powders used for seasoning snack crackers (such cheese powders) have formula ingredients that can brown very quickly when exposed to heat, giving the snack product an undesirable burnt flavor and/or appearance.

Multi-textural snack products are also enjoyed by consumers. However, conventional seasoning powders, which generally form a powdery layer on the surface of the product, do not provide a multi-textural aspect to the snack product.

SUMMARY

Described herein are cheese slurry compositions that are suitable for topical application to an outer surface of a snack product prior to baking. Upon baking, the slurry compositions form a highly-flavored crispy topping or coating that simulates the appearance of melted cheese on the outer surface of the snack product. The cheese slurry compositions generally include cheese powder solids, an emulsifier, oil, water, and pregelatinized starch in amounts effective to provide a generally uniform crispy topping having an appearance of melted cheese adhered to the outer surface of the outer surface of the baked snack product. The cheese slurry compositions contain minimal amounts of reducing sugars, polyols, and the like and substantially no enzyme-modified cheese, buttermilk, whey, maltodextrins, or yeast extract so that the cheese slurry compositions are resistant to undesirable browning and burning upon baking.

The slurries described herein generally include about 5 percent to about 60 percent cheese powder solids, about 0.1 percent to about 1.5 percent of an emulsifier, about 35 percent to about 65 percent oil, and about 0.25 percent to 5 percent pregelatinized starch. Suitable pregelatinized starches are starches containing amylopectin and substantially no amylose. In some approaches, the pregelatinized starch may contain 100 percent amylopectin and no amylose. In some approaches, the pregelatinized starch is a pregelatinized waxy starch.

The slurry also may include up to about 5 percent, in some approaches from up to about 4 percent, in some approaches up to about 3 percent, and in some approaches up to about 2 percent added water. In some approaches, the slurry may have a total moisture content of no more than about 5 percent, in some approaches no more than about 4 percent, in some approaches no more than 3 about percent, and in some approaches no more than about 2 percent total moisture from all sources. If the slurry contains too much moisture, the starch in the slurry may gelatinize prior to application of the slurry to the dough surface, which may cause processing difficulties.

In some approaches, the slurry may include 0.05 percent or less of acid salts and, in some approaches, substantially no food acids. The inventors found that using acid salts to enhance tangy flavors of the product in place of conventionally-used food acids (e.g., acetic acid, lactic acid) resulted in more flavor enhancement at much lower use levels. Exemplary acid salts may include, for example, calcium lactate, crystalline hydrate of calcium lactate, calcium acetate, calcium butyrate, sodium citrate, and combinations thereof.

Also described herein are baked snack products having a highly-flavored topping or coating thereon that simulates the appearance of melted cheese. The baked snack products may be obtained by applying a cheese slurry composition described herein to an outer surface of an unbaked dough component to form a coated unbaked dough component and baking the coated unbaked dough component to a moisture content of about 5 percent or less, in some approaches about 4 percent or less, and in some approaches about 3 percent or less by weight of the final product. In some approaches, the cheese slurry composition may form at least about 5 percent of the baked dough or snack product, in some approaches at least about 10 percent, in some approaches at least about 15 percent, and in some approaches at least about 20 percent of the final baked snack product by weight. In some approaches, the baked cheese slurry on the surface of the snack product may form up to about 50 percent of the final baked snack product by weight.

The cheese slurry compositions are generally obtained by combining the slurry ingredients to form a mixture, and blending the mixture in high shear mixer to reduce the particle size of the slurry and to break up agglomerates. High shear mixing also improves dispersion of solids in the slurry and reduces undesirable oil separation. In some approaches, the slurry may be held in a reservoir configured to continuously agitate and maintain the slurry at a suitable temperature to minimize separation and/or stratification prior to being applied to the outer surface of the dough component.

The dough component may include any dough that is suitable for snack product applications. In some approaches, the dough component may be a cracker or biscuit dough. In other approaches, the dough component may be a cookie dough. The dough component may be obtained by combining and mixing the dough ingredients in a mixer, feeding the dough through a sheeter to gauging sections to form a thin sheeted dough, and feeding the sheeted dough through a rotary tied cutter to cut the dough sheet into individual pieces. The slurry is then applied to an outer surface of the dough pieces in a uniform manner to form a coated unbaked dough component. The slurry may be applied to the dough component using any suitable technique. The coated unbaked dough component is then baked to a moisture content of about 5 percent or less.

The slurry applied to the dough prior to baking achieves excellent adhesion and uniform coverage on the outer surface of the baked snack product. The slurry forms a crispy, highly flavored topping layer fused to the snack product, giving a unique appearance, texture and flavor intensity.

BRIEF DESCRIPTION OF THE DRAWINGS

FIG. 1 is a front perspective view of an exemplary multi-textured baked snack product having a highly-flavored topping or coating thereon that simulates the appearance of melted cheese.

FIG. 2 is a front view of an exemplary multi-textured baked snack product having a highly-flavored topping or coating thereon that simulates the appearance of melted cheese.

FIG. 3 is a flow diagram of an exemplary method of making a multi-textured baked snack product having a highly-flavored topping or coating thereon that simulates the appearance of melted cheese.

FIG. 4 is a block diagram of a system for making a cheese slurry composition suitable for topical application to an outer surface of a snack product prior to baking.

DETAILED DESCRIPTION

Figure 5:
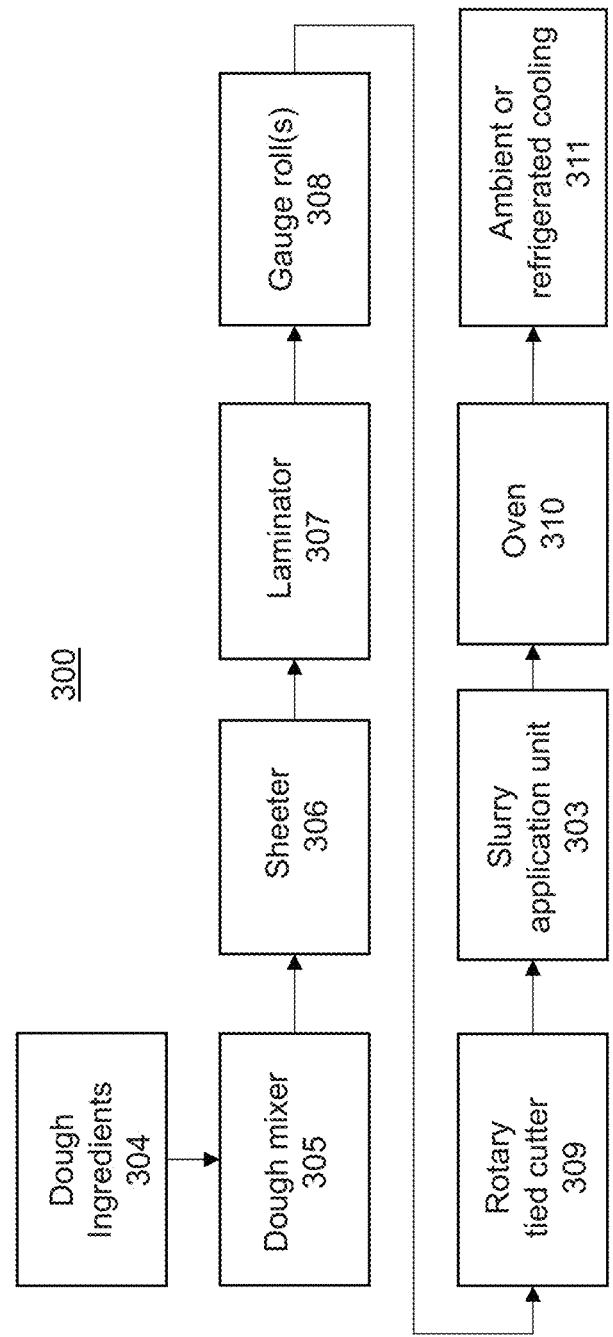
FIG. 5 is a block diagram of a system for making a multi-textured baked snack product having a highly-flavored topping or coating thereon that simulates the appearance of melted cheese.

Reference now will be made to certain detailed aspects of various embodiments of the present disclosure. It is to be understood that the disclosed embodiments are merely exemplary of the invention that may be embodied in numerous and alternative forms. Therefore, specific details disclosed herein are not to be interpreted as limiting, but merely as a representative basis for any aspect of the invention and/or as a representative basis for teaching one skilled in the art to variously employ the invention.

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Percentages used herein are based on weight unless otherwise indicated.

The cheese slurry compositions described herein, which are suitable for topical application on an outer surface of a snack product prior to baking, address numerous problems associated with conventional flavorings topically applied to snack products. Food powders such as seasoning powders are conventionally applied to snacks after baking. These conventional food powders, when applied after baking, often exhibit limited adhesion to the snack surface (e.g., less than 20 percent product weight) and inconsistent coating and have also been found to rub off on processing equipment, hands, etc. While adhesion of food powders applied after baking may be improved, in some cases, by dispersing the food powder in a water-in-oil emulsion, this technique can alter the texture of the snack product and reduce shelf life and may require an additional drying step.

Applying conventional food powders prior to baking also presents challenges. For example, many food powders (such as, for example, dairy and cheese powders), fail when topically applied to a snack dough prior to baking due to burning, blistering, and development of a hard, undesirable texture of the topping and/or poor adherence. Typical cheese powders used for seasoning crackers have formula ingredients that brown very quickly when exposed to heat, such as enzyme-modified cheese, buttermilk, whey, maltodextrins, yeast extract, lactose, and acids. Sweet food powders (such as, for example, fruit-based powders) may also suffer from undesirable browning and burning during baking due to high amounts of reducing sugars in these powders.

To address the above-described challenges, the inventors developed cheese slurry compositions that are suitable for topical application to an outer surface of a snack product prior to baking. The cheese slurry compositions generally include cheese powder solids, an emulsifier, oil, water, and pregelatinized starch in amounts effective to provide a generally uniform, crispy topping having an appearance of melted cheese adhered to the outer surface of the baked snack product. The cheese slurry compositions enable excellent adhesion and uniform coverage of up to 50% wt/wt topping on the finished snack. And since the slurries include minimal amounts of reducing sugars, polyols, and the like and substantially no enzyme-modified cheese, buttermilk, whey, maltodextrins, or yeast extract, undesirable browning and burning often encountered when cheese powders are applied prior to baking can be avoided. The inventors also unexpectedly found that using acid salts to enhance tangy cheese and dairy flavors of the product in place of conventionally-used food acids results in more flavor enhancement at much lower use levels than for food acids.

The cheese slurry compositions described herein generally include about 30 percent to about 60 percent natural cheese powder solids, in some approaches about 35 percent to about 60 percent natural cheese powder solids, and in some approaches about 40 percent to about 55 percent natural cheese powder solids. Conventional cheese powders generally include natural cheese, milk (e.g., buttermilk, non-fat dry milk), proteins (e.g., whey), bulking agents/carriers (e.g., maltodextrin, flour, gums, etc.), and flavors (e.g., spices, acids, yeast extract, etc.). The inventors found that using these conventional cheese powders to form a pre-bake slurry resulted in burning during the baking process due to the presence of milk proteins and/or reducing sugars such as lactose. Reducing sugars are sugars that contain a free aldehyde or ketone group, which allows the sugar to act as a reducing agent. Examples of reducing sugars include, but are not limited to, glucose, fructose, lactose, galactose, ribose, xylose, maltose, and arabinose. The presence of reducing sugars in products intended for baking can present challenges. For example, the heating of reducing sugars during baking can lead to undesirable caramelization of the sugars. Additionally, reducing sugars readily interact with proteins and give rise to Maillard reaction products, which can lead to progressive browning and aroma formation. Ingredients such as yeast extract, enzyme-modified cheese, and flavor acids present in conventional cheese powder solids are also believed to contribute to burning during baking.

The natural cheese powder solids used to form the cheese slurry compositions described herein have 1 percent or less of reducing sugars, polyols, and the like and contain substantially no enzyme-modified cheese, buttermilk, whey, maltodextrins, or yeast extract, resulting in a baked snack having a desirable cheese flavor after baking without undesirable browning or burning. The natural cheese included in the natural cheese powder solids can be derived from any natural cheese or combination thereof including, but not limited to, Yellow Cheddar, White Cheddar, Four Cheese, Gouda, Muenster, Parmesan, Romano, and combinations thereof. In some approaches, the natural cheese powder solids may include cream cheese solids.

The amount of cheese powder solids in the slurry is selected to provide a desirable, non-powdery texture while also providing the slurry with a viscosity suitable for processing and application to the dough component. In some cases, slurries with lower amounts of cheese solids can have faster sedimentation rates, which can cause the slurry to have a powdery texture. While slurries with higher amounts of cheese solids can have slower sedimentation rates, as the solids content increases the viscosity of the slurry can also increase, which can cause processing problems. In some approaches, the temperature of slurries having higher solids contents may be increased to reduce viscosity to a viscosity suitable for processing. In some approaches, the optimal solids content for slowing sedimentation and controlling viscosity may be different for different varieties of cheese powder solids. For example, as shown in Example 5, cheese slurry compositions containing different varieties of natural cheese powder solids (Yellow Cheddar, White Cheddar, Four Cheese) have varying viscosities at a given temperature.

Food acids such as, for example, acetic acid and lactic acid, can also contribute to undesirable browning and burning. Thus, in some approaches, the cheese slurry compositions described herein may contain substantially no food acids. The slurries may include 0.05 percent or less of acid salts to enhance the tangy and/or tart flavors that may be lost by reducing the use of food acids. Exemplary acid salts may include, but are not limited to, calcium lactate, crystalline hydrate of calcium lactate, calcium acetate, calcium butyrate, sodium citrate, and combinations thereof. The inventors found that using acid salts to enhance tangy and tart flavors of the product in place of conventionally-used food acids resulted in more flavor enhancement at much lower use levels without effecting the appearance or rheology of the slurry, while also reducing the risk of undesirable browning and burning. The inventors also found that the inclusion of acid salts serves to replace some of the acidic flavor intensity that may be lost due to the exclusion and/or removal of ingredients such as enzyme-modified cheese from the cheese powder or slurry ingredients.

The cheese slurry composition also includes one or more vegetable oils. Exemplary oils may include, for example, coconut oil, palm kernel oil, soybean oil, palm oil, sunflower oil, corn oil, canola oil, high oleic canola oil, cottonseed oil, peanut oil, and combinations thereof. The slurry may include about 35 percent to about 65 percent oil, in some approaches from about 40 percent to about 60 percent oil, and in some approaches from about 42 to about 58 percent oil. The oil functions as a vehicle to deliver suspended cheese powder solids to the surface of the dough component.

The cheese slurry composition may include a small amount of water. The slurry composition may include up to about 5 percent, in some approaches from up to about 4 percent, in some approaches up to about 3 percent, and in some approaches up to about 2 percent added water. The amount of added water may be based on, for example, the amount of moisture provided by one or more of the slurry ingredients. For example, if a higher moisture ingredient is added to the slurry, the amount of added water may be reduced to ensure a suitable moisture content of the slurry. In some approaches, the slurry may include no added water, for example, when sufficient moisture is contributed by other slurry ingredients. In some approaches, the slurry may have a total moisture content of no more than about 5 percent, in some approaches no more than about 4 percent, in some approaches no more than 3 about percent, and in some approaches no more than about 2 percent total moisture from all sources.

As demonstrated in Example 4 below, it was found that increasing the formula water above 5 percent increased the slurry viscosity due to starch gelation. The inventors also found that the moisture content of the slurry can affect the rate of browning of the slurry and bake-out of the snack product. Specifically, the inventors found that for every 1 percent of added water, the finished moisture content of the final product increased by about 0.36 percent, requiring longer baking times and/or higher baking temperatures to achieve a target moisture content of 5 percent or less. Thus, the amount of added water in the slurry is carefully selected to avoid gelation during processing and to minimize baking time to avoid undesirable textures and flavors in the final baked product.

The starch included in the cheese slurry composition is a pregelatinized starch. The slurry includes about 0.25 percent to about 5 percent of the pregelatinized starch. Adding too much starch to the cheese slurry can undesirably reduce the flavor intensity of the slurry on the final baked product. During the early stages of baking a snack product in which the cheese slurry containing the pregelatinized starch is topically applied to a dough component, moisture escaping the dough "activates" or swells the pregelatinized starch into an elastic matrix so that a crispy, textured topping is formed in which the cheese powder is held in a generally uniform, crispy, highly-flavored topping adhered to the baked snack. Pregelatinized starches are ideal for this purpose because they require less water to gel and allow for shorter baking times, thereby reducing the risk of undesirable browning. Preferably, the pregelatinized starch has low water-binding ability so that the available water boils off during baking to provide the baked slurry with a bubbly texture on the surface of the snack resembling melted cheese. Suitable pregelatinized starches preferably contain amylopectin and substantially no amylose. In some approaches, the pregelatinized starch may contain 100 percent amylopectin and no amylose. In some approaches, the pregelatinized starch is a waxy starch.

The cheese slurry composition can also include one or more emulsifiers in a total amount of about 0.1 percent to about 1.5 percent. Suitable emulsifiers may include, but are not limited to, lecithin, monoglycerides, diglycerides, PolyGlycerol Ester (PGE), calcium stearyl lactylate, and combinations thereof.

The slurries described herein may include additional ingredients such as seasonings, spices, herbs, flavorings, gums, fillers, etc., provided the cheese slurry maintains minimal amounts of reducing sugars, polyols, and the like and substantially no enzyme-modified cheese, buttermilk, whey, maltodextrins, or yeast extract so that the cheese slurry composition is resistant to browning and burning upon baking.

In some approaches, the cheese slurry composition may include a fruit or vegetable component. The fruit or vegetable component may include any fruit or vegetable-based ingredient suitable for baking. For example, the fruit or vegetable component may include fruit or vegetable powder, dried fruit or vegetable, restructured fruit or vegetable, concentrates, crumbles, puree, mash, fruit or vegetable fiber, fillers, and combinations thereof. Suitable fruit or vegetable components are resistant to browning and burning upon baking and preferably include less than 1 percent reducing sugars. In some approaches, the fruit component may be a low moisture, bake-stable fruit filler that is resistant to browning and burning upon baking. The bake-stable fruit filler may include additional ingredients to render them bake-stable such as starch, modified starch, flours, pectin, fruit solids, sugar solids and additional hydrocolloids including but not limited xanthan gum and alginate and the like. In some approaches, the bake-stable filler may include one or more fruit acids such as, for example citric acid and/or malic acid, which have a lower propensity to burn during baking compared to, for example, tartaric acid. The fruit acids included in the fruit filler are generally disposed within the matrix of the fruit filler, further reducing the risk of undesirable browning due to the fruit acids. In some approaches, the fruit or vegetable component may be incorporated into the cheese slurry composition. In some approaches, the fruit or vegetable component may be dropped or swirled separately onto a surface of the slurry applied to the dough component prior to baking.

The slurries described herein may have a variety of flavor profiles rendering them suitable for use in a wide range of savory, non-sweet, and sweet baked snack products. For instance, the slurry may have a savory, cheesy flavor profile consistent with the flavor of natural cheese such as, for example, cheddar cheese. Such a cheese slurry may be useful as a coating or topping on a cracker to form a baked cheese snack.

In another example, the cheese slurry may have a flavor profile similar to that of cream cheese. The cream cheese slurry may be useful as a topping or coating on crackers, biscuits, cookies, cereal bars, or other baked products. In some approaches, the cream cheese slurry may include a bake-stable fruit component. In one approach, the bake-stable fruit component may be a bake-stable, low moisture filler as described above. The filler may be, for example, a blueberry or strawberry filler. The cream cheese slurry including the fruit component may have a sweeter flavor profile than a comparable cream cheese slurry that does not include a fruit component and, as such, may be especially suitable for use in sweet baked snack products such as cookies or cereal bars.

The cheese slurry compositions described herein are generally obtained by combining the slurry ingredients to form a mixture and blending the mixture in a high shear mixer to reduce the particle size of the slurry and to break up agglomerates. Exemplary ingredient ranges for a cheese slurry composition suitable for topical application on a baked snack product prior to baking are provided in Table 1.

TABLE 1

| Ingredient | % formula (range 1) | % formula (range 1) | % formula (range 1) |
|---|---|---|---|
| Natural cheese powder solids | 30-60 | 35-60 | 40-55 |
| Vegetable Oil | 35-65 | 40-60 | 42-58 |
| Water | 0-5 | 0.1-3 | 0.25-2 |
| Pregelatinized starch | 0.25-5 | 0.25-4 | 0.25-3 |
| Emulsifier | 0.1-1.5 | 0.1-1.5 | 0.1-1.5 |
| Acid salt(s) | 0-0.05 | 0-0.05 | 0-0.05 |

An exemplary formula for a cheese slurry composition having about 40 percent cheese powder solids is provided in Table 2.

TABLE 2

| Ingredient | % dry weight basis | % formula |
|---|---|---|
| Pregelatinized starch | 1.19 | 2.46 |
| Water | 0.00 | 1.07 |
| Calcium lactate | 0.02 | 0.05 |
| Vegetable oil | 29.40 | 56.02 |
| Lecithin | 0.36 | 0.69 |
| Cheese powder | 20.01 | 39.71 |

An exemplary formula for a cheese slurry composition having about 48 percent cheese powder solids is provided in Table 3.

TABLE 3

| ingredient | % dry weight basis | % formula |
|---|---|---|
| Pregelatinized starch | 1.19 | 2.46 |
| Water | 0.00 | 1.07 |
| Calcium lactate | 0.02 | 0.05 |
| Vegetable oil | 25.03 | 47.69 |
| Lecithin | 0.36 | 0.69 |
| Cheese powder | 24.20 | 48.04 |

Since the cheese slurry compositions are resistant to undesirable browning and burning upon baking, they can be applied to an outer surface of a dough component prior to baking to form a baked snack product having a highly-flavored topping or coating that simulates the appearance of melted cheese.

The dough component may comprise any dough composition that is suitable for baking. The formulation of the dough component is not particularly limited as long as the dough component has sufficient moisture to "activate" or swell the pregelatinized starch in the slurry as the moisture in the dough evaporates into the slurry thereon. The activated starch in the slurry forms an elastic matrix in which the cheese powder is held in a uniform, crispy, highly-flavored topping adhered to the baked snack. In some approaches, the dough component may be a non-sweet or savory dough such as, for example, a cracker dough. In other approaches, the dough component may be a sweet dough such as, for example, a cookie dough.

In some embodiments, the baked snack product may have sweet dough component and the cheese slurry applied to the outer surface of the dough component prior to baking may include cream cheese solids and, optionally, a fruit component.

FIGS. 1 and 2 illustrate an exemplary, non-limiting example of a baked snack product 100 in which the baked cheese slurry composition forms a multi-textured topping 110 on the surface of a dough component 120. As discussed, moisture in the dough component activates the starch in the slurry during baking to form a topping having a bubbly texture 130 that simulates the appearance of melted cheese on the surface of the snack product. In some approaches, the baked cheese slurry on the surface of the snack product forms at least about 5 percent of the final baked snack product by weight, in some approaches at least about 10 percent, in some approaches at least about 15 percent, and in some approaches at least about 20 percent of the final baked snack product by weight. In some approaches, the baked cheese slurry on the surface of the snack product may form up to about 50 percent of the final baked snack product by weight. The baked snack product generally has a final moisture content of about 5 percent or less, in some approaches about 4 percent or less, and in some approaches about 3 percent or less by weight of the final product.

The final baked snack product can have any suitable thickness or shape depending, for example, on the nature of the product, desired texture and/or mouthfeel, formulation of the dough component, intended use of the product, process and/or machine limitations, etc.

An exemplary method 200 of making a baked snack product having a highly-flavored topping or coating that simulates the appearance of melted cheese is illustrated in FIG. 3. In step 210, slurry ingredients including natural cheese powder solids, an emulsifier, oil, water, and pregelatinized starch (along with any additional ingredients) are combined. In some approaches, dry ingredients (e.g., natural cheese powder solids, pregelatinized starch, etc.) may be dry-blended, while water, oil, and an emulsifier may be separately premixed prior to being combined with the dry-blended mix. The combined ingredients are mixed in a high shear mixer in step 220. High shear mixing serves to reduce the particle size of the slurry mixture and break up agglomerates, and also improves dispersion of solids in the slurry and reduces undesirable oil separation. Suitable high shear mixing devices include, for example, high speed rotor mixers, mixers having a saw-tooth disperser blade, and other mixing devices effective to reduce the particle size of the slurry mixture and break up agglomerates, improve dispersion of solids in the slurry, and reduce undesirable oil separation. Following high shear mixing, the slurry is generally pumped to a holding tank associated with the slurry application unit. In some approaches, the mixed slurry may be held in a slurry reservoir tank configured to continuously agitate and maintain the slurry at a suitable temperature to minimize separation and/or stratification prior to being applied to the outer surface of the dough component. For example, in some approaches, the slurry may be maintained at a temperature of about 100° F. to about 125° F., and in some approaches a temperature of about 110° F. In some approaches, the cheese slurry may have a water content (Aw) of 0.30 to about 0.50 prior to application.

The dough component is provided in step 230. The dough component is generally an unbaked dough component, which may be cut and/or shaped into individual pieces. The slurry is applied to an outer surface of the dough component in step 240. The slurry may be applied to the dough component using any topping or liquid application system or technique effective to achieve suitable coverage, adhesion, appearance, texture, etc., such as, but not limited to, rolling, slinging, spraying, dripping, waterfall applicator, and the like.

In some approaches, the slurry may be applied to the dough component using, for example, a rotating disk or a dispersion drum to create a wide spray pattern that will be oriented perpendicular to the direction of travel of the dough component. The slurry is applied to achieve suitable dough coverage, for example, between about 5 percent to about 55 percent by weight of the unbaked dough-slurry combination. In some approaches, the slurry has a temperature of about 100° F. to about 125° F. during application to the outer surface of the dough pieces, and in some approaches a temperature of about 110° F. Preferably, the dough pieces are kept at a temperature between 75° F. and 105° F. during slurry application to facilitate uniform slurry coverage and so the slurry will be able to migrate evenly onto the surface of the dough pieces.

In step 250, the coated dough component is baked to a moisture content of 5 percent or less. In some approaches, the coated dough component is baked to a moisture content of about 4 percent or less, and in some approaches about 3 percent or less. In some approaches, the coated dough pieces may be baked at a temperature of about 375° F. for about 5 minutes to achieve a suitable final moisture content.

Application of the cheese slurry composition to the dough prior to baking achieves excellent adhesion and uniform coverage on the outer surface of the baked snack product. In some approaches, the baked cheese slurry on the surface of the snack product forms at least about 5 percent of the final baked snack product by weight, in some approaches at least about 10 percent, in some approaches at least about 15 percent, and in some approaches at least about 20 percent of the final baked snack product by weight. In some approaches, the baked cheese slurry on the surface of the snack product may form up to about 50 percent of the final baked snack product by weight.

A system 300 for making a baked snack product having a highly-flavored topping or coating that simulates the appearance of melted cheese is also described herein, with reference to FIGS. 4 and 5. As shown in FIG. 4, the slurry may be formed by combining effective amounts of natural cheese powder solids, emulsifier, oil, water and pregelatinized starch. In one approach, as illustrated in FIG. 4, the natural cheese powder solids and pregelatinized starch (along with optional additional dry ingredients) may be dry-blended in a first premixer (301a), while the water, oil, and emulsifier may be premixed in a second premixer (301b) prior to being combined in the high shear mixer 302, where the combined ingredients will be further mixed under high shear. High shear mixing serves to reduce the particle size of the slurry mixture and break up agglomerates, and also improves dispersion of solids in the slurry and reduces undesirable oil separation. Following high shear mixing, the slurry is transferred to a slurry application unit 303 for application to an outer surface of a dough component.

The cheese slurry is generally piped from the mixing tank to a holding tank associated with the slurry application unit on the line by pump feed, which can present challenges with higher solids/higher viscosity slurries. The inventors found that some cheese slurry formulations (particularly those having a higher solids contents) have higher viscosities, which can clog the processing lines of the system. Thus, the slurry may be heated to achieve a suitable viscosity for processing and application. For example, cheese slurries having a cheese solids content of about 40 percent to about 55 percent may be heated or otherwise maintained at a temperature of about 75° F. to 131° F. to achieve a viscosity of, for example, about 200 cP to about 5000 cP. In some approaches, it is preferable for the cheese slurry to have a viscosity of about 2000 cP or less. To balance solids sedimentation yet allow easy flow, in some approaches, higher-solids cheese slurries may be heated at a sufficient temperature to achieve a viscosity of about 1200 cP to about 2000 cP. In some approaches, the slurry may be heated to a temperature of about 100° F. to about 125° F. during processing and/or application to facilitate a balance between low solids sedimentation and viscosity, and in some approaches a temperature of about 110° F. In other approaches, the slurry may be of suitable viscosity at ambient or room temperature such that no heating of the slurry is needed during processing and/or application With reference to FIG. 4, the dough component may be obtained by combining and mixing dough ingredients 304 in a dough mixer 305. Any suitable dough mixer can be employed. The dough mixture is then fed through a sheeter 306 to form a thin sheeted dough. In some approaches, the sheeted dough may be optionally fed through a laminator 307 and may undergo multiple laminations (e.g., up to six laminations). The dough sheet is fed through one or more gauge rolls 308 and upon reaching a suitable thinness the dough is fed to a rotary tied cutter 309 to cut the dough sheet into individual pieces. In some approaches, the dough component may have a thickness of, for example, about 25 mm prior to application of the slurry. The dough pieces are then conveyed to the inlet of the slurry application unit 303, where the slurry is applied to the dough pieces in a uniform manner to achieve suitable dough coverage of, for example, between about 5 percent to about 55 percent by weight of the unbaked dough-slurry combination. Preferably, the dough pieces are kept at a temperature between 75° F. and 105° F. during slurry application to facilitate uniform slurry coverage and so the slurry will be able to migrate evenly onto the surface of the dough pieces.

The slurry application unit 303 may include any application system effective to achieve suitable coverage, adhesion, appearance, texture, etc., such as, but not limited to, rolling, slinging, spraying, dripping, waterfall applicator, and the like. In some approaches, the slurry application unit 303 utilizes a rotating disk or a dispersion drum to create a wide spray pattern that will be oriented perpendicular to the direction of travel of the dough component. The rotating disk or dispersion drum atomizes the slurry solution using the mechanical energy of a motor to turn the disk or drum creating centrifugal force to apply the slurry to the product. It should be understood that the other application techniques may be also used.

In some approaches, the slurry application unit 303 may include a reservoir tank, which holds the slurry and has a small agitator to keep the slurry from separating and/or to minimize stratification. The slurry application unit may be jacketed to maintain the slurry solution at the proper temperature to minimize the risk of clogging the line to the slurry applicator and the drainage surfaces. For example, in some approaches, the slurry may be maintained at a temperature of about 100° F. to about 125° F., and in some approaches a temperature of about 110° F. Slurry pumps should be of a suitable configuration and have sufficient flow rate to keep solids in suspension, facilitate uniform slurry application, and to prevent charring and agglomeration of the slurry. Additional factors that may impact slurry application include percent solids in the slurry, particle size of the solids, amounts of fat and/or sugar in the slurry, glass transition temperature of individual ingredients, and the temperature of the slurry.

The slurry application unit 303 applies the slurry to the dough pieces in a uniform manner to achieve suitable dough coverage, for example, between about 5 percent to about 55 percent by weight of the unbaked dough-slurry combination.

Following application of the slurry to the dough pieces, the coated dough pieces are baked in a suitable oven 310 to a moisture content of about 5 percent or less, in some approaches about 4 percent or less, and in some approaches about 3 percent or less. In some approaches, the coated dough pieces may be baked at a temperature of about 375° F. for about 5 minutes to achieve a suitable final moisture content. The baked snack product is then cooled to a suitable temperature using any suitable technique such as, for example, ambient or refrigerated cooling 311.

The cheese slurry composition described herein, which include minimal amounts of reducing sugars, polyols, and the like and substantially no enzyme-modified cheese, buttermilk, whey, maltodextrins, and yeast extract, allows for the topical application of natural cheese powder solids to a snack product prior to baking while minimizing the risk of undesirable browning and burning often encountered with cheese powders applied prebake. The ability to apply the cheese slurry prior to baking is significant. During baking, moisture in the dough interacts with the pregelatinized starch in the slurry to form an elastic matrix containing the cheese powder solids. After baking, the elastic matrix containing the cheese powder solids is fused to the surface of the dough, resulting in improved adhesion and coverage of the cheese solids on the snack product. The interaction between the moisture in the dough and the pregelatinized starch in the slurry also results in a topping having the appearance of melted cheese. And reducing the use of food acids in the slurry, which are prone to browning and burning, and replacing them with acid salts at much lower levels can provide improved flavor intensity. The result is a baked snack product having a crispy, highly-flavored topping layer fused to the snack product, giving a unique appearance, texture and flavor intensity.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight

EXAMPLES

Example 1: Cheese Slurry Solids Consistency

In a bench trial, a cheese slurry composition was formed by combining oil, lecithin, water, cheddar cheese powder solids, and pregelatinized starch in amounts listed below in Table 5 in a spackle mixer and then mixed in a high shear mixer (OLSA, Breddo Likwifier).

TABLE 5

| Ingredient | % dry weight basis | % formula |
|---|---|---|
| Pregelatinized starch | 2.48 | 2.64 |
| Water | 0.00 | 0.26 |
| Lactate | 0.01 | 0.014 |
| Vegetable Oil | 53.96 | 52.77 |
| Lecithin | 0.72 | 0.7 |
| Cheese Powder | 42.82 | 43.62 |

The slurry further included 1.250 percent sodium and 7.5 percent protein to assess the slurry solids consistency. The slurry was transferred to a slurry application unit equipped with dispersion drums (General Oil Equipment, Variable Profile Liquid Spray System).

Figure 6:
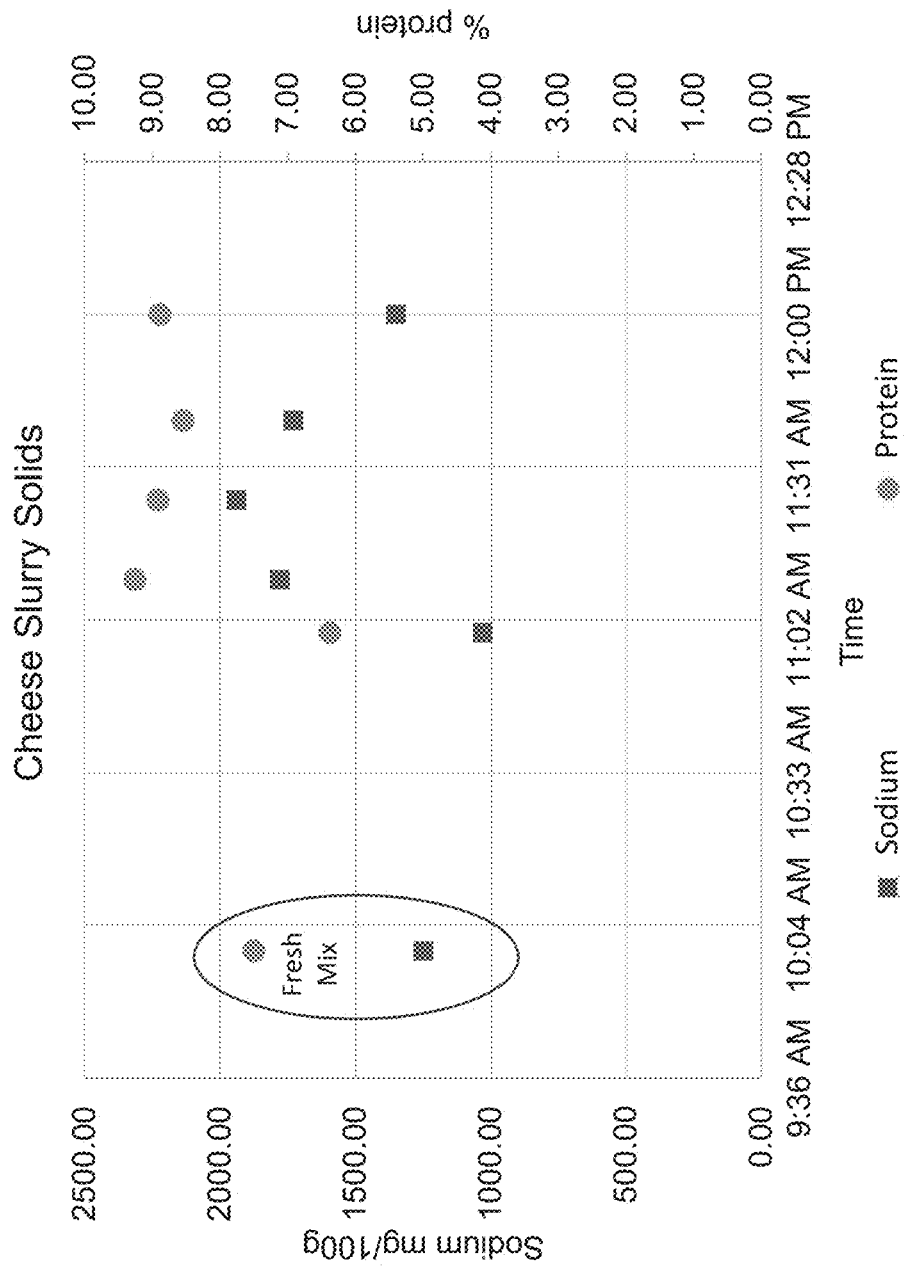
FIG. 6 is a graph showing the consistency of cheese solids in an exemplary cheese slurry composition.

Cheese slurry solids consistency delivered by the slurry application unit was assessed by sodium and protein concentration analysis in the slurry. Samples were collected over a one-hour period. The results are illustrated in FIG. 6. The sodium and protein concentrations were initially low (1030 mg/100 g; 6.38%) compared to fresh mixed slurry (1250 mg/100 g; 7.5%). Subsequent samples were higher for both sodium and protein. Sodium for these samples ranged from 1350 mg/100 g to 1940 mg/100 g and the protein range was from 8.55% to 9.26%. The inventors discovered that the sodium and protein contents were initially low due to insufficient circulation after pump stoppage. As illustrated in FIG. 6 and Table 6, the protein concentration then stabilized to an average 8.9%+/−0.3%. Sodium concentration, similar to protein, was initially low due to not enough recirculation after pump stoppage. Sodium, after the initial point, stabilized to an average 1.7%+/−0.250%. The inventors found that preferably the slurry application unit sprayer should pump/re-circulate for at least 20 minutes after a significant pump stoppage to re-suspend solids and ensure consistent solids coverage.

TABLE 6

| Time | Sodium (mg/100 g) | Protein (%) | ave Na | ave protein | Std. Dev. |
|---|---|---|---|---|---|
| Fresh mix | 1250.00 | 7.50 | | | |
| 11:00 AM | 1030.00 | 6.38 | | | |
| 11:10 AM | 1780.00 | 9.6 | 1700.00 | | 250 |
| 11:25 AM | 1940.00 | 8.92 | | 8.91 | 0.29 |
| 11:40 AM | 1730.00 | 8.55 | | | |
| 12:00 PM | 1350.00 | 8.89 | | | |

Figure 7:
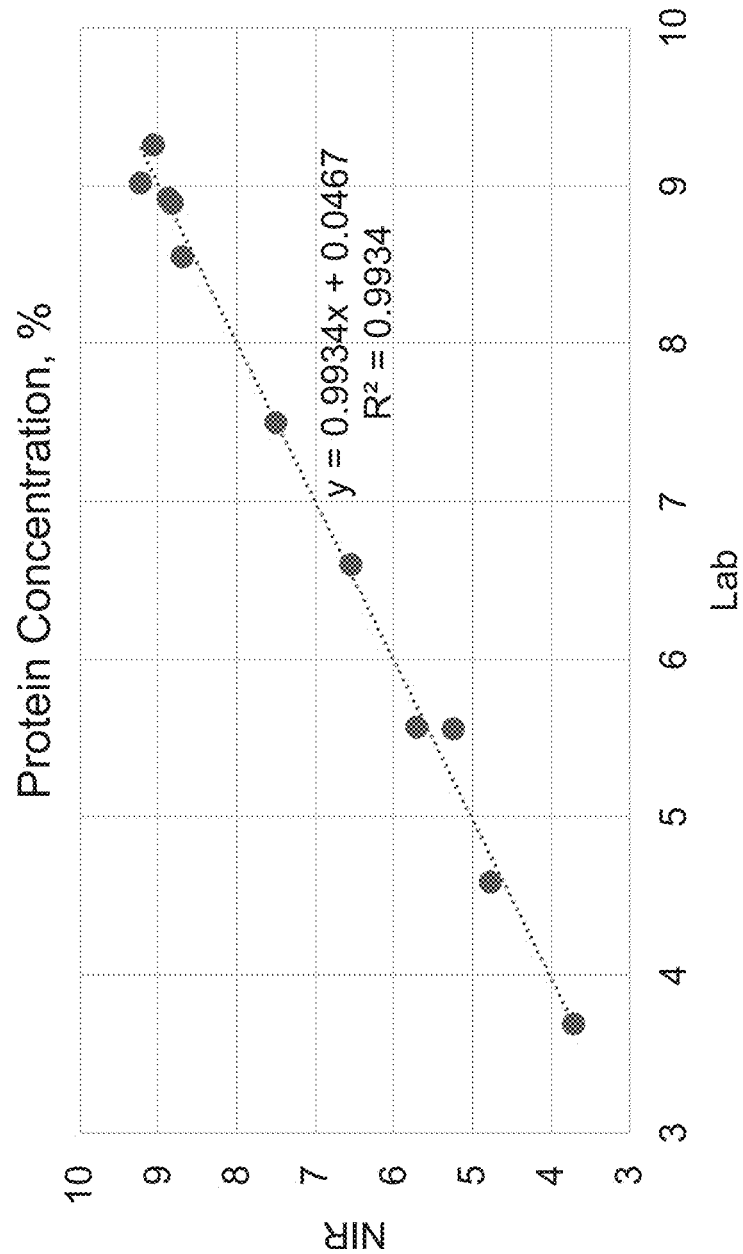
FIG. 7 is a graph showing the homogeneity of an exemplary cheese slurry composition using NIR (Near-Infrared Spectroscopy).

In addition, Near-Infrared Spectroscopy (NIR) measurement of protein was used as an "at line" tool for measuring cheese slurry solids homogeneity. Six slurry samples were scanned by NIR in the wavelength range from 1400 to 1650 nm to ensure the amide bands were captured. The absorption values for the six slurry samples collected correlated with the analytical protein values to an Rsq=0.993 and SECV of +/−0.163, as shown in FIG. 7.

The data presented herein demonstrate that the use of a slurry application unit equipped with dispersion drums can advantageously maintain a homogeneous dispersion of cheese solids in the slurry.

Example 2: Consistency of Slurry Coverage

The slurry of Example 1 was collected on a tray run under the applicators and the slurry weight was recorded. The samples were collected over a one-hour period. As shown in Table 7, slurry delivery weights were consistent over the one-hour test period with a standard deviation in delivery weight of 2 percent to 6 percent depending on spray profile settings.

TABLE 7

| Time | Tray wt | Tray + slurry | Slurry weight | % Std. Dev. |
|---|---|---|---|---|
| 11:00 AM | 440.02 | 472.50 | 32.48 | 1.95 |
| 11:00 AM | 443.00 | 470.80 | 27.80 | |
| 11:10 AM | 443.40 | 473.20 | 29.80 | |
| 11:10 AM | 443.40 | 474.10 | 30.70 | |
| 11:25 AM | 442.30 | 485.00 | 42.70 | 5.93 |
| 11:25 AM | 442.50 | 495.35 | 52.85 | |
| 11:40 AM | 442.50 | 484.50 | 42.00 | |
| 11:40 AM | 442.50 | 482.00 | 39.50 | |
| 12:00 PM | 442.50 | 495.50 | 53.00 | |
| 12:00 PM | 442.50 | 484.90 | 42.40 | |

Example 3: Cheese Slurry Viscosity as a Function of Temperature

Figure 8:
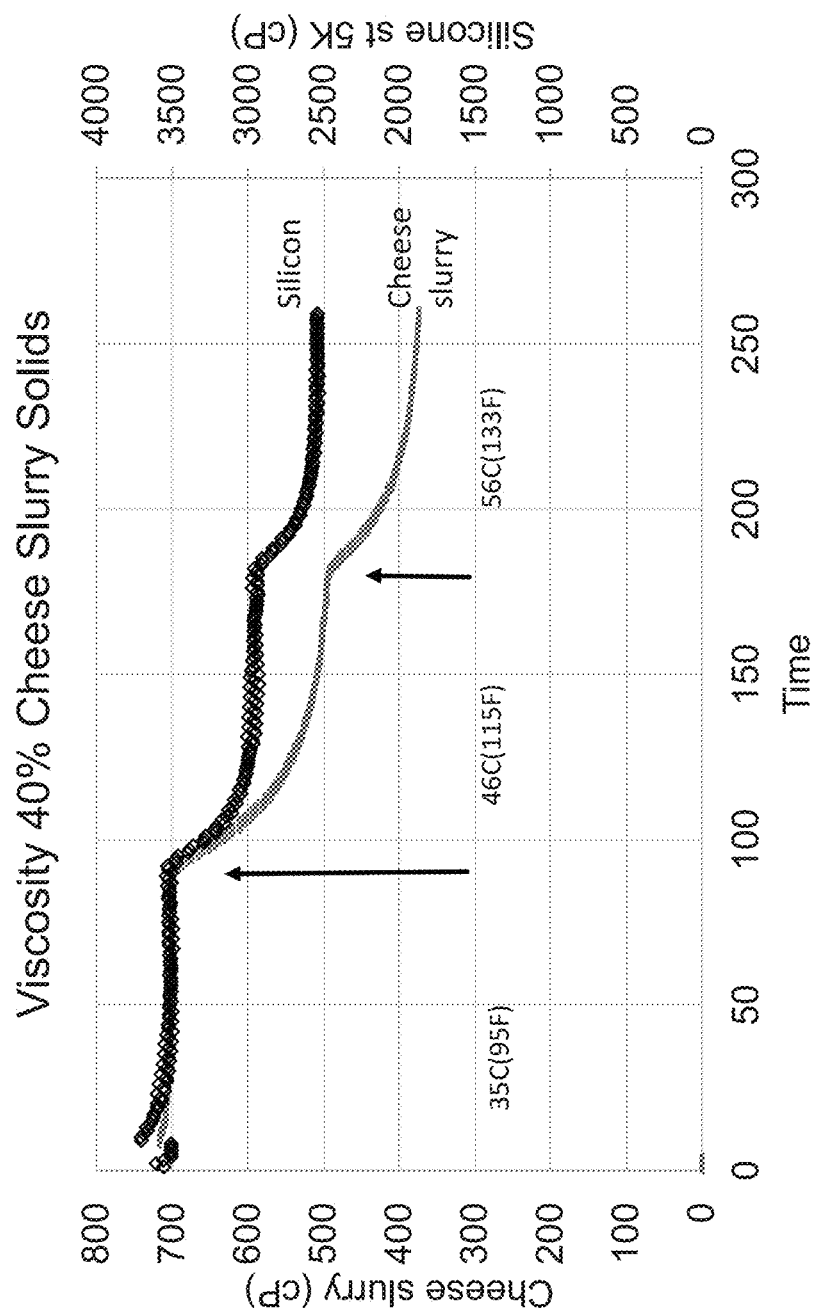
FIG. 8 is a graph comparing viscosities of an exemplary cheese slurry having 40% cheese solids as a function of temperature.

A cheese slurry composition having 40 percent cheese solids was prepared in accordance with the formula provided in Table 5 above. A 25 ml sample of the cheese slurry was stirred at 160 rpm and the viscosity was tested after equilibration at 35° C. (95° F.), 46° C. (115° F.) and 56° C. (133° F.) using a Rapid Viscosity Analyzer (Perten, model 4500). The viscosity results, reported in cP, are in provided Table 8 below and in FIG. 8. A silicone viscosity standard solution of 5,000 cP (25° C.) was also tested for reference.

TABLE 8

| Temperature (F.) | Stir rate (rpm) | Cheese Slurry Viscosity (cP) | Silicone Std. 5,000 (cP) |
|---|---|---|---|
| 95 | 160 | 705 | 3539 |
| 115 | 160 | 497 | 2962 |
| 133 | 160 | 376 | 2531 |

The data illustrate that increasing the temperature of the cheese slurry having 40 percent cheese solids up to a temperature of 133° F. reduces the slurry viscosity.

Example 4: Starch Gelation as a Function of Formula Water

In this example, a cheese slurry composition having the formulation provided in Table 9 was prepared.

TABLE 9

| Ingredient | % formula |
|---|---|
| Pregelatinized starch | 2.46 |
| Water | 1.07 |

TABLE 9-continued

| Ingredient | % formula |
| --- | --- |
| Calcium lactate | 0.05 |
| Vegetable oil | 56.02 |
| Lecithin | 0.69 |
| Cheese powder | 39.71 |

Figure 9:
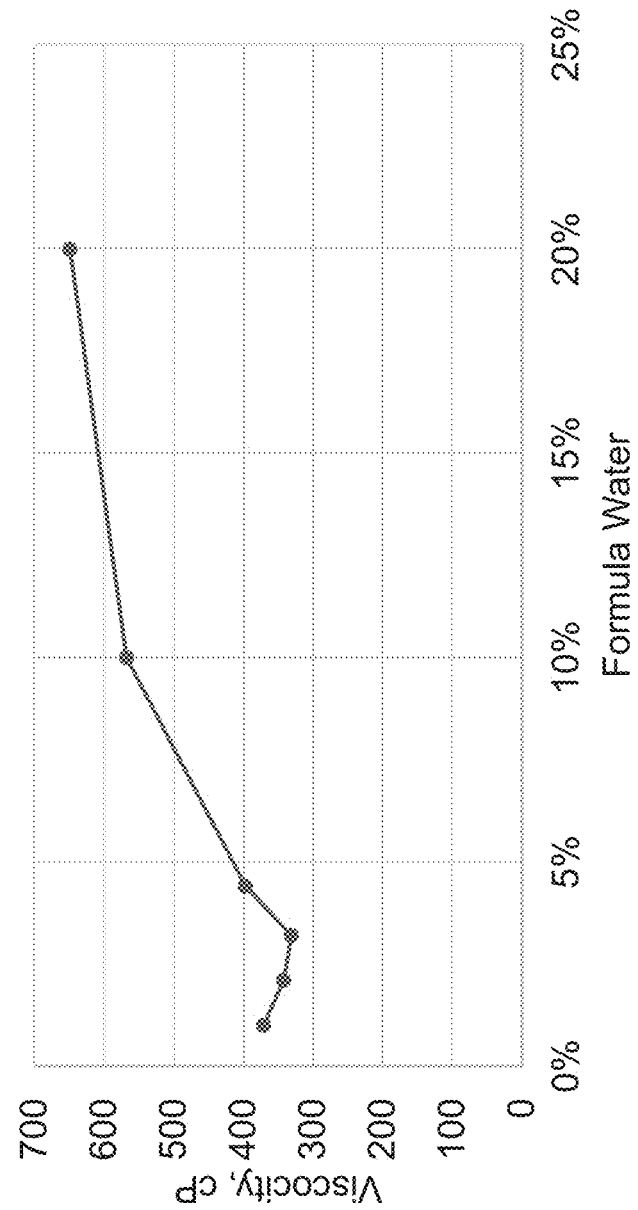
FIG. 9 is a graph comparing viscosities of a cheese slurry having 40% cheese solids as a function of added formula water.
Figure 10:
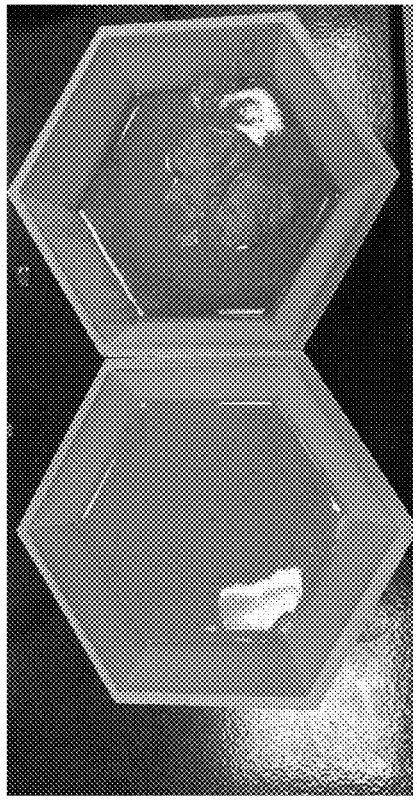
FIG. 10 shows starch gelation of a cheese slurry having 40% cheese solids at 10% added formula water.

Water was added to a cheese slurry composition having about 40 percent cheese solids in amounts of 1%, 2%, 3% 11.7% and 19.5% of formula weight. Viscosities of 25 ml samples of the slurry compositions were measured at 35° C. using a Rapid Viscosity Analyzer (Perten, model 4500) with constant stirring at 160 rpm and constant temperature. As shown in FIG. 9, slurry viscosity increases from 380 to 400 cP as the formula water of the slurry increased from 1 percent to 5 percent, while slurry viscosity increased significantly above 5 percent formula water. Increasing formula water from 3 percent to 10 percent increased the viscosity from 320 cP up to 580 cP and starch gelation occurs, as shown in FIG. 10.

Example 5: Viscosity as a Function of Cheese Powder Solids and Temperature

Cheese slurries containing one of Yellow Cheddar, White Cheddar, and Four Cheese powder solids were formulated at 40% cheese powder solids according to the formulation provided in Table 10 below. Cheese slurries containing one of Yellow Cheddar, White Cheddar, and Four Cheese powder solids were formulated at 46.4% cheese powder solids, 49.2% cheese powder solids, or 53.2% cheese powder solids by removing oil from the formula in Table 10 and adding additional cheese powder, according to the formulas below in Tables 11, 12, and 13. All other ingredient compositions did not change.

TABLE 10

Cheese Slurry at 39.7%
Cheese Powder Solids

| Ingredient | % formula |
| --- | --- |
| Pregelatinized starch | 2.46 |
| Water | 1.07 |
| Calcium Lactate | 0.05 |
| Vegetable oil | 56.02 |
| Lecithin | 0.69 |
| Cheese powder | 39.71 |

TABLE 11

Cheese Slurry at 46.4%
Cheese Powder Solids

| Ingredient | % formula |
| --- | --- |
| Pregelatinized starch | 2.46 |
| Water | 1.07 |
| Calcium lactate | 0.05 |
| Vegetable oil | 49.30 |
| Lecithin | 0.69 |
| Cheese powder | 46.43 |

TABLE 12

Cheese Slurry at 49.6%
Cheese Powder Solids

| Ingredient | % formula |
| --- | --- |
| Pregelatinized starch | 2.46 |
| Water | 1.07 |
| Calcium lactate | 0.05 |
| Vegetable oil | 46.17 |
| Lecithin | 0.69 |
| Cheese powder | 49.55 |

TABLE 13

Cheese Slurry at 53.7%
Cheese Powder Solids

| Ingredient | % formula |
| --- | --- |
| Pregelatinized starch | 2.46 |
| Water | 1.07 |
| Calcium lactate | 0.05 |
| Vegetable oil | 42.02 |
| Lecithin | 0.69 |
| Cheese powder | 53.70 |

Viscosities of the cheese slurries were tested using a using a Rapid Viscosity Analyzer (Perten, model 4500) with constant stirring at 160 rpm and constant temperature. Three temperatures were tested: 35° C. (95° F.), 45° C. (113° F.) and 55° C. (131° F.).

Figure 11:
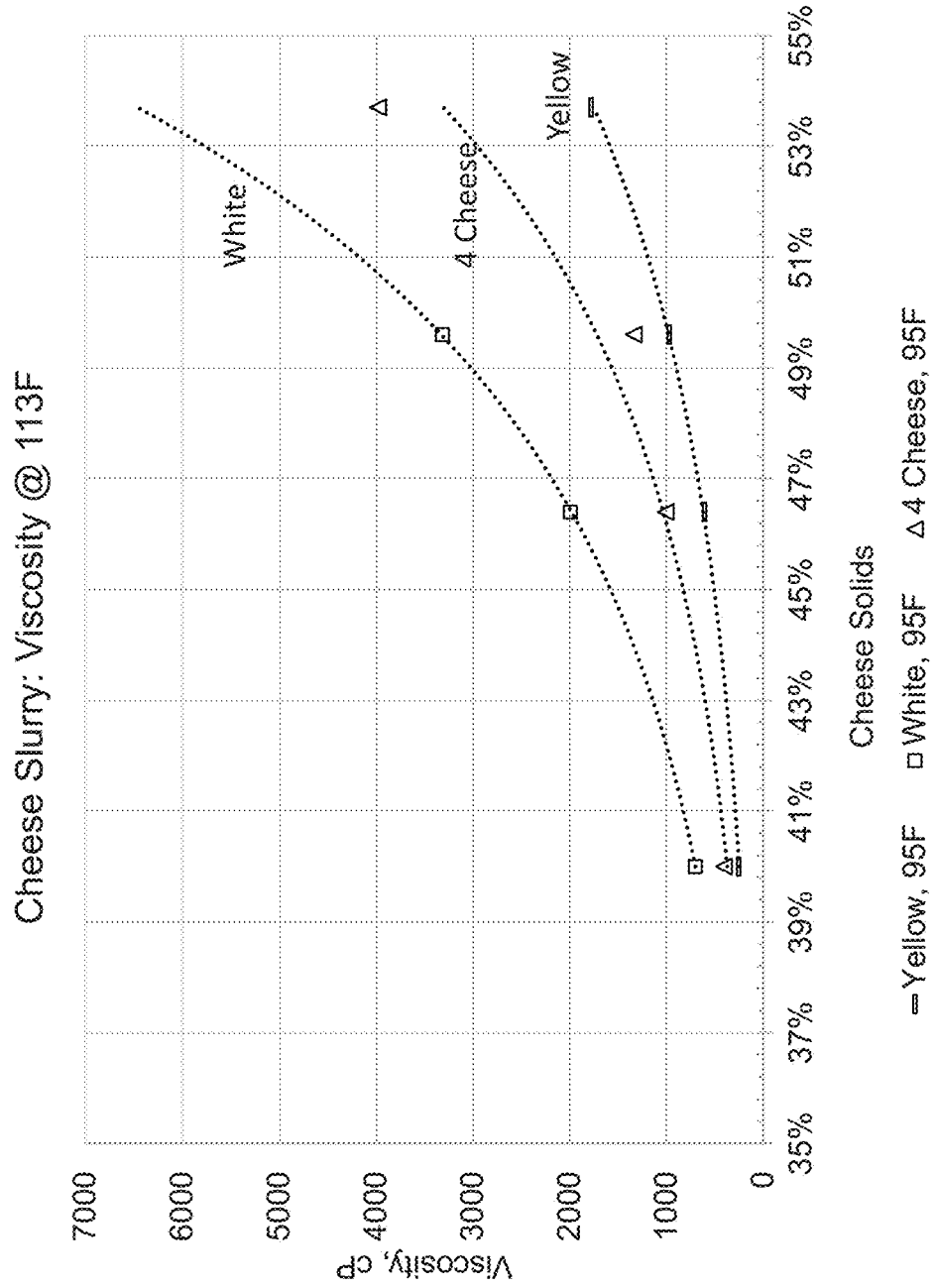
FIG. 11 is a graph comparing viscosities of various exemplary cheese slurry compositions as a function of cheese solids at 113° F.

FIG. 11 illustrates that cheese solids of 46.4% results in Yellow Cheddar viscosity of 525 cP at 113° F., Four Cheese viscosity of 1000 cP at 113° F., and White Cheddar viscosity of 1500 cP at 113° F.

Figure 12:
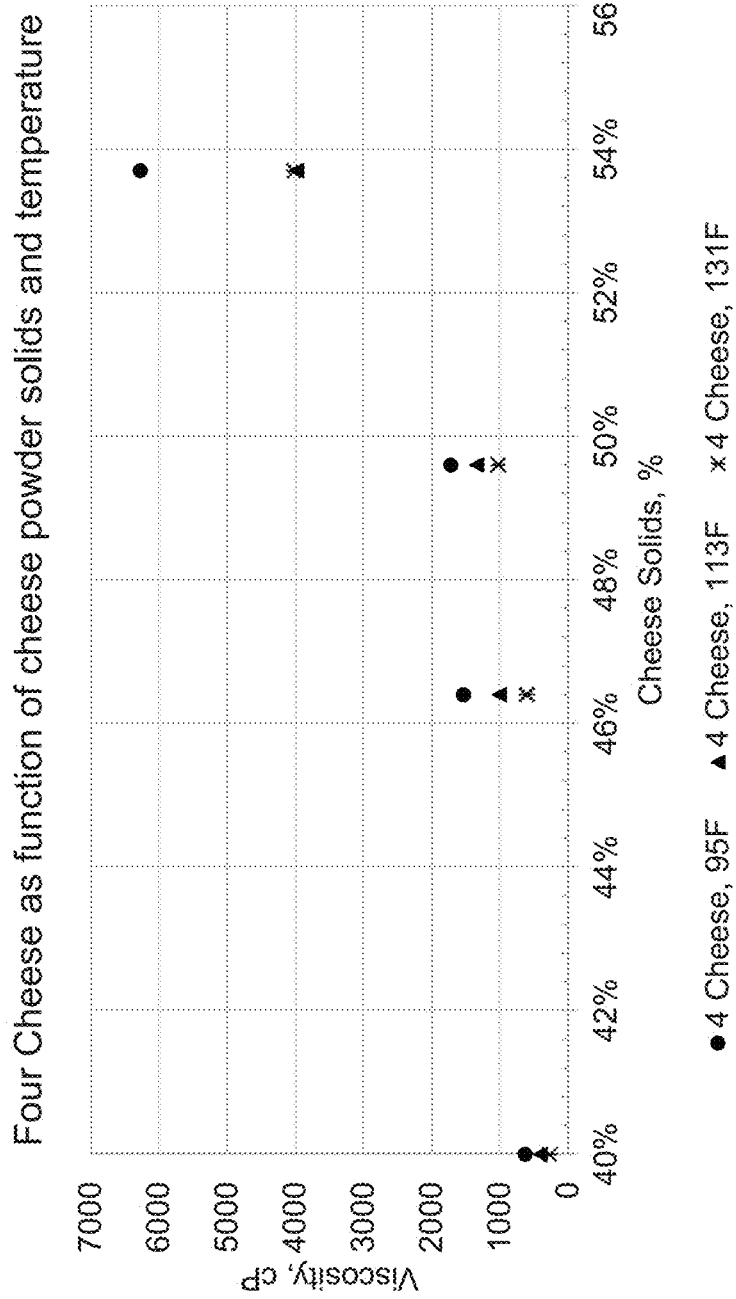
FIG. 12 is a graph comparing viscosities of an exemplary Four Cheese slurry composition as a function of cheese powder solids and temperature.
Figure 13:
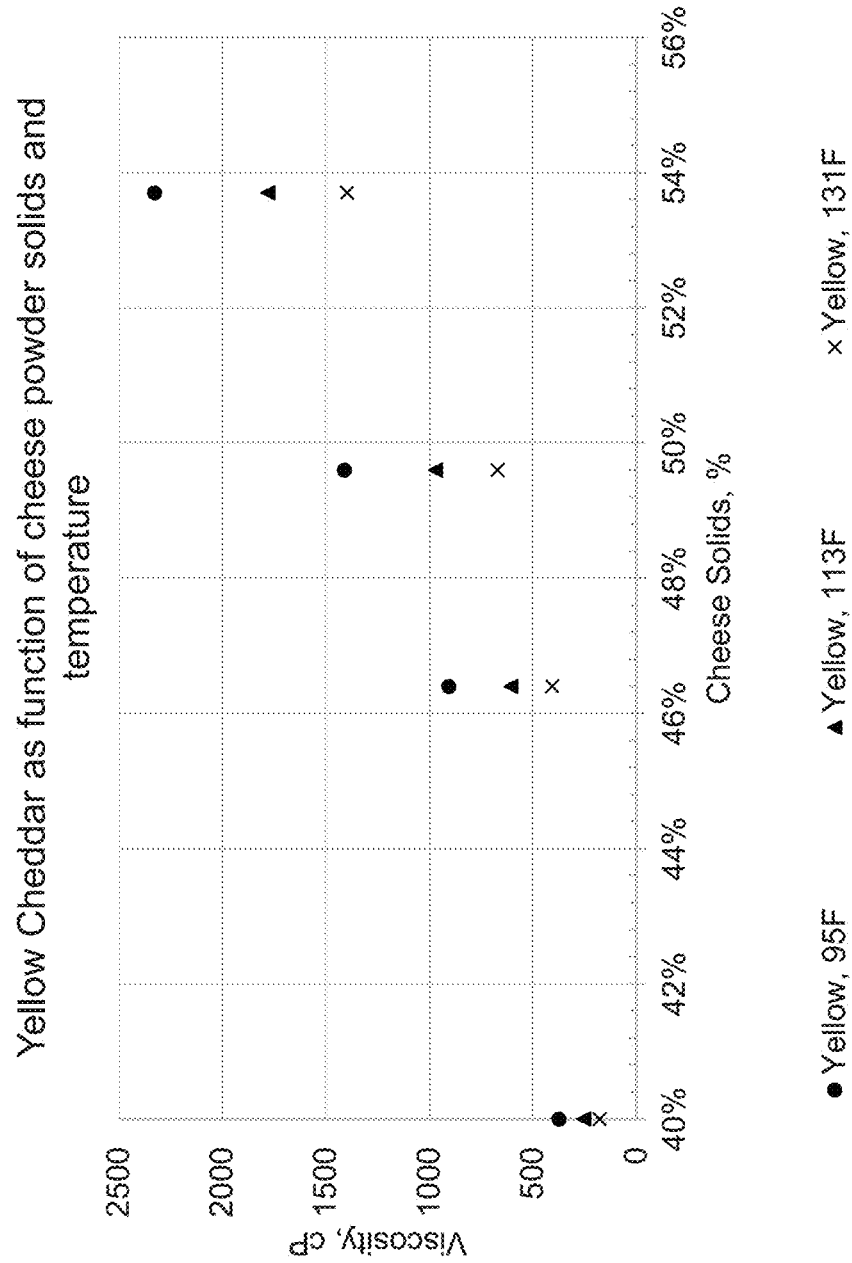
FIG. 13 is a graph comparing viscosities of an exemplary Yellow Cheddar cheese slurry composition as a function of cheese powder solids and temperature.
Figure 14:
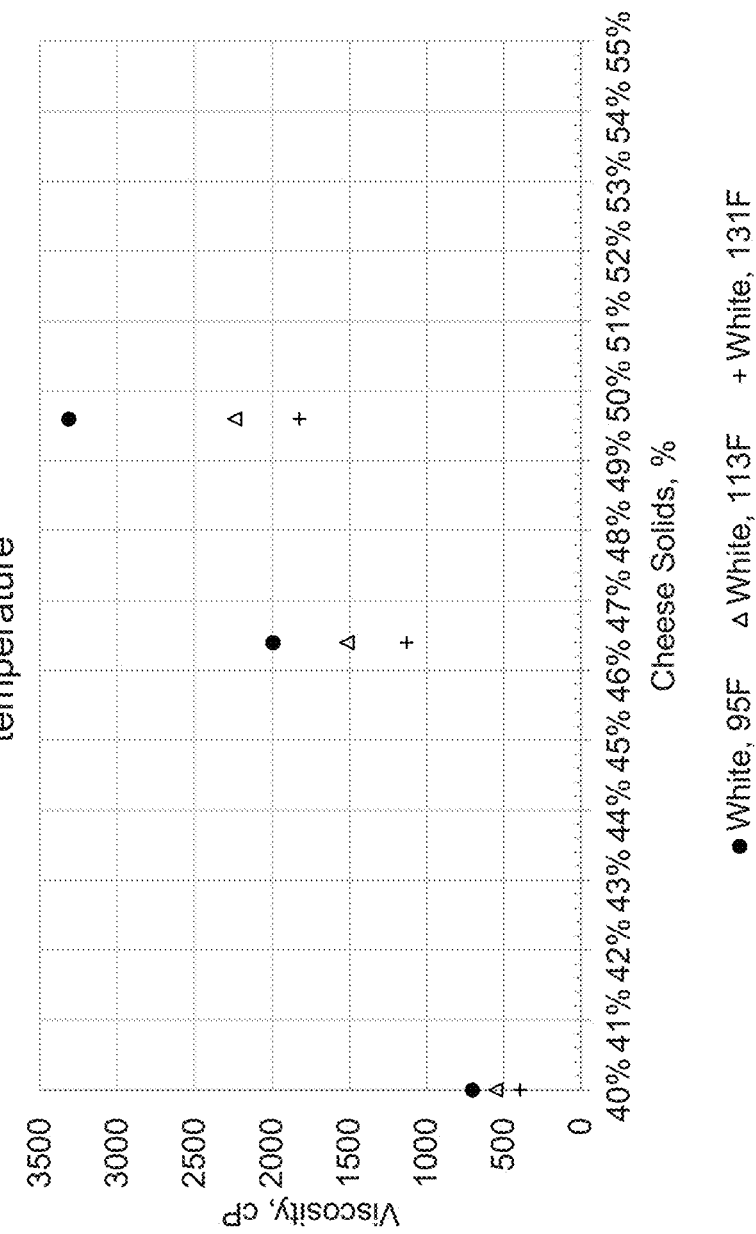
FIG. 14 is a graph comparing viscosities of an exemplary White Cheddar cheese slurry composition as a function of cheese powder solids and temperature.

The viscosity of each of the three cheese powders, at each of the three temperatures tested are showed FIG. 12 (Four Cheese), FIG. 13 (Yellow Cheddar) and FIG. 14 (White Cheddar).

Figure 15:
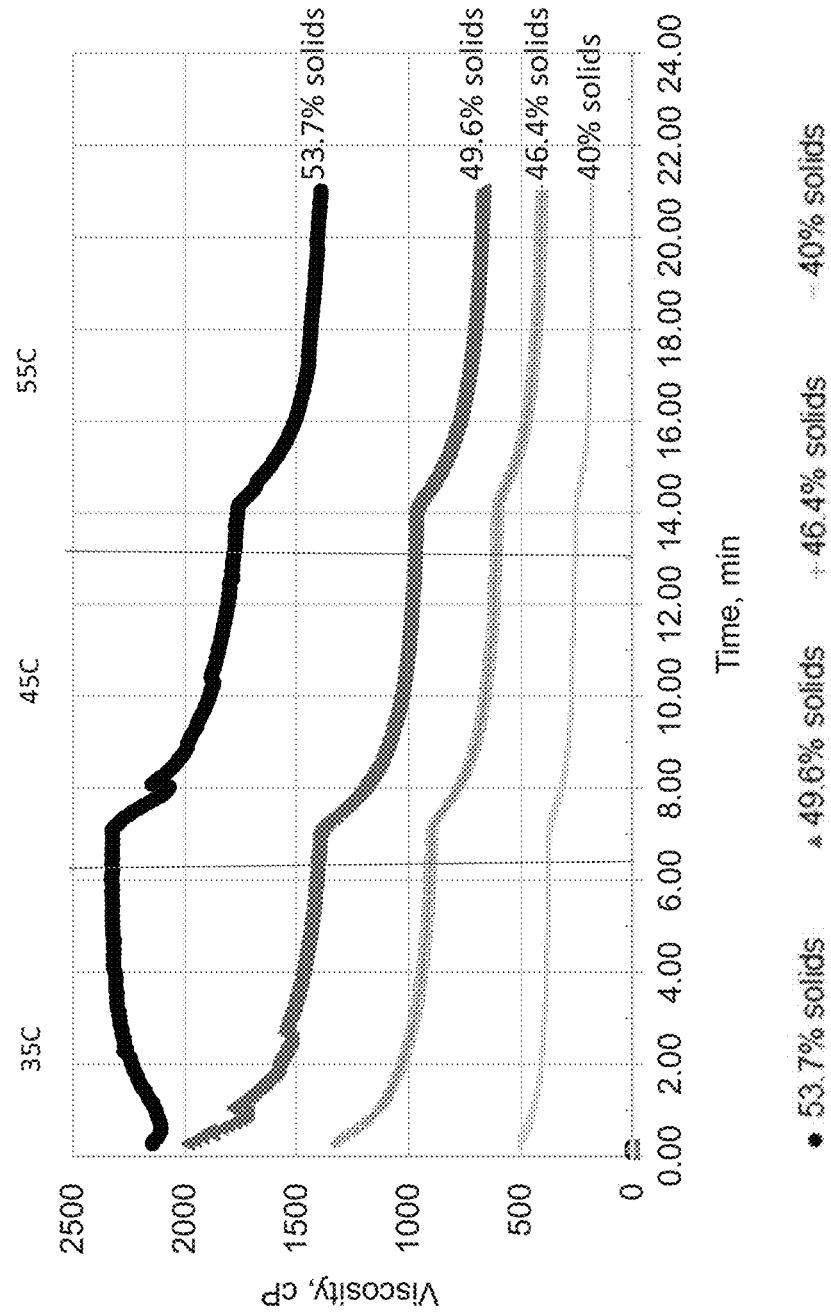
FIG. 15 is a graph comparing viscosities of an exemplary Yellow Cheddar cheese slurry composition as a function of cheese powder solids at 113° F.

FIG. 15 illustrates a typical profile of a Yellow Cheddar Cheese slurry tested at 35° C., 45° C. and 55° C.

The inventors found that while higher solids content cheese slurries generally have slower sedimentation rates, they may not flow well at ambient temperatures, which can cause problems during processing and application. Thus, to decrease the viscosity of high solids slurries to a viscosity that is acceptable for slurry processing and application while also maintaining a slow sedimentation rate, the slurry temperature may be increased to, for example, 113° F. The type of cheese powder solids used in the slurry should also be considered when balancing sedimentation rate and viscosity, as viscosities may vary between types of cheese powder solids at a given temperature, as demonstrated in FIG. 11.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A cheese slurry composition for topical prebake application on an outer surface of a baked dough product, the cheese slurry composition comprising:

about 30 percent to about 60 percent natural cheese powder solids, about 0.1 percent to about 1.5 percent of an emulsifier, about 35 percent to about 65 percent oil, up to about 5 percent water, and about 0.25 percent to about 5 percent pregelatinized starch effective to provide a crispy topping having a bubbly appearance uniformly adhered to the outer surface of the baked dough product; and up to 1 percent reducing sugars, polyols, or a combination thereof and substantially no enzyme-modified cheese, buttermilk, whey, maltodextrins, or yeast extract so that the cheese slurry composition is resistant to browning and burning upon baking, wherein the cheese slurry has a total moisture content of 5% or less.

2. The cheese slurry composition of claim 1, wherein the pregelatinized starch comprises amylopectin and substantially no amylose.

3. The cheese slurry composition of claim 1, further comprising 0.05 percent or less acid salts and substantially no food acids.

4. The cheese slurry composition of claim 3, wherein the acid salts comprise at least one of calcium lactate, crystalline hydrate of calcium lactate, calcium acetate, calcium butyrate, sodium citrate, and combinations thereof.

5. The cheese slurry composition of claim 1, wherein the natural cheese powder solids comprise cream cheese solids.

6. The cheese slurry composition of claim 1, further comprising a bake-stable fruit or vegetable component.

7. A cheese-flavored, multi-textured baked snack product comprising:
a baked dough component; and
a co-baked cheese topping, the cheese topping formed of a cheese slurry having a total moisture content of 5% or less applied to the outer surface of the dough component prior to baking, the cheese slurry comprising:
about 30 percent to about 60 percent natural cheese powder solids, about 0.1 percent to about 1.5 percent of an emulsifier, about 35 percent to about 65 percent oil, up to about 5 percent water, and about 0.25 percent to about 5 percent pregelatinized starch effective to uniformly adhere the cheese slurry to the outer surface of the dough component upon baking to form the cheese topping and providing the cheese topping with a crispy texture and a bubbly appearance; and
up to 1 percent reducing sugars, polyols, or a combination thereof and substantially no enzyme-modified cheese, buttermilk, whey, maltodextrins, or yeast extract so that the cheese slurry is resistant to browning and burning upon baking.

8. The baked snack product of claim 7, wherein the cheese slurry comprises cream cheese solids, a bake-stable fruit component, and/or a bake-stable vegetable component.

9. The baked snack product of claim 7, wherein the cheese topping forms at least about 20 percent by weight of the baked dough product.

10. The baked snack product of claim 7 having a moisture content of about 5 percent or less.

11. The baked snack product of claim 7, wherein the pregelatinized starch comprises amylopectin and substantially no amylose.

12. The baked snack product of claim 7, further comprising 0.05 percent or less acid salts and substantially no food acids.

13. The baked snack product of claim 12, wherein the acid salts comprise at least one of calcium lactate, crystalline hydrate of calcium lactate, calcium acetate, calcium butyrate, sodium citrate, and combinations thereof.

14. A method of making a cheese-flavored, multi-textured baked snack product, the method comprising;
providing an unbaked dough component;
applying a cheese slurry having a total moisture content of 5% or less to an outer surface of the unbaked dough component to form a coated unbaked dough component;
baking the coated unbaked dough component to a moisture content of about 5percent or less,
wherein the cheese slurry comprises about 30 percent to about 60 percent natural cheese powder solids, about 0.1 percent to about 1.5 percent of an emulsifier, about 35 percent to about 65 percent oil, up to about 5 percent water, and about 0.25 percent to about 5 percent pregelatinized starch effective to uniformly adhere the cheese slurry to the outer surface of the dough product and to provide a crispy topping having a bubbly appearance upon baking; and
up to 1 percent reducing sugars, polyols, or a combination thereof and substantially no enzyme-modified cheese, buttermilk, whey, maltodextrins, or yeast extract so that the cheese topping is resistant to browning and burning upon baking.

15. The method of claim 14, wherein the cheese slurry is applied to the outer surface of the unbaked dough component by at least one of rolling, slinging, spraying, dripping, and waterfall application.

16. The method of claim 14, wherein the cheese slurry has a temperature of about 100° F. to about 125° F. during application of the cheese slurry to the outer surface of the unbaked dough component.

17. The method of claim 14, wherein the dough component is maintained at a temperature of about 75° F. and 105° F. during application of the cheese slurry to facilitate uniform coverage and even migration of the cheese slurry on the dough component.

18. The method of claim 14, wherein the coated unbaked dough component comprises about 5 percent to about 55 percent of the cheese slurry by weight of the coated unbaked dough component.

19. The method of claim 14, wherein the cheese slurry is obtained by combining the natural cheese powder solids, emulsifier, oil, water, and pregelatinized starch to form a slurry mixture and mixing the slurry mixture in a high shear mixer reduce a particle size of the slurry mixture and to break up agglomerates.

20. The method of claim 19, wherein the cheese slurry is continuously agitated and maintained at a temperature effective to minimize separation and/or stratification prior to being applied to the dough component.

21. The method of claim 14, wherein the cheese slurry comprises cream cheese solids, a bake-stable fruit component, and/or a bake-stable vegetable component.

22. The method of claim 14, wherein the pregelatinized starch comprises amylopectin and substantially no amylose.

23. The method of claim 14, further comprising 0.05 percent or less acid salts and substantially no food acids.

24. The method of claim 23, wherein the acid salts comprise at least one of calcium lactate, crystalline hydrate of calcium lactate, calcium acetate, calcium butyrate, sodium citrate, and combinations thereof.

* * * * *